(12) United States Patent
Buss et al.

(10) Patent No.: US 6,779,328 B2
(45) Date of Patent: Aug. 24, 2004

(54) CUTTING IMPLEMENT HAVING ANTI-BLOWOUT LIP AND EXTENSION

(75) Inventors: Steven Henry Buss, Horicon, WI (US); Todd Lynn Smith, Beaver Dam, WI (US)

(73) Assignee: Deers & Company, Moline, IL (US)

( * ) Notice: Subject to any disclaimer, the term of this patent is extended or adjusted under 35 U.S.C. 154(b) by 0 days.

(21) Appl. No.: 09/902,084

(22) Filed: Jul. 9, 2001

(65) Prior Publication Data

US 2003/0005680 A1 Jan. 9, 2003

(51) Int. Cl.[7] ............................................. A01D 67/00
(52) U.S. Cl. ...................................................... 56/320.1
(58) Field of Search ............................... 56/320.1, 295, 56/320.2, 255, 12.4, 12.5, DIG. 20

(56) References Cited

U.S. PATENT DOCUMENTS

| | | | |
|---|---|---|---|
| 3,673,772 A | 7/1972 | Holzhei | 56/13.1 |
| 3,851,452 A * | 12/1974 | Brocas | 56/17.4 |
| 4,502,271 A * | 3/1985 | Hansen et al. | 56/13.6 |
| 4,543,773 A * | 10/1985 | Reilly | 56/13.6 |
| 5,191,756 A | 3/1993 | Kuhn | 56/17.5 |
| 5,267,429 A | 12/1993 | Kettler et al. | 56/295 |
| 5,457,947 A | 10/1995 | Samejima et al. | |
| 5,483,790 A | 1/1996 | Kuhn et al. | 56/17.5 |
| 5,488,821 A | 2/1996 | McCunn et al. | 56/320.2 |
| 5,609,011 A | 3/1997 | Kuhn et al. | 56/17.5 |
| 5,765,346 A | 6/1998 | Benter et al. | 56/2 |
| 5,845,475 A * | 12/1998 | Busboom et al. | 56/17.4 |
| 5,860,272 A | 1/1999 | Griffin | 56/320.1 |
| 5,884,466 A * | 3/1999 | Willmering et al. | 56/320.1 |
| 5,921,072 A * | 7/1999 | Cargile | 56/17.5 |
| 5,987,863 A | 11/1999 | Busboom et al. | 56/320.1 |
| 6,038,840 A | 3/2000 | Ishimori et al. | |
| 6,065,276 A * | 5/2000 | Hohnl et al. | 56/320.1 |
| 6,189,307 B1 * | 2/2001 | Buss et al. | 56/2 |
| 6,192,666 B1 * | 2/2001 | Sugden et al. | 56/13.6 |

FOREIGN PATENT DOCUMENTS

| | | |
|---|---|---|
| DE | 295 12 057 | 7/1995 |
| EP | 1 186 221 | 3/2002 |
| FR | 2 643 213 | 8/1990 |
| FR | 2 548 864 | 1/1995 |
| GB | 2 347 838 | 9/2000 |
| JP | 1 010913 | 1/1989 |

OTHER PUBLICATIONS

John Deere Parts Catalog —PC 2725, "Mower Deck Baffles", pp. 55–56, 60–68, and 60–10. date of publication Jan. 31, 2001, published in U.S.A..

Copies of nine (9) photographs of baffles used with mower decks manufactured by John Deere, photographs taken by a Deere and Company employee in Jun. and Oct. 2001 in U.S.A..

* cited by examiner

Primary Examiner—Árpád Fábián Kovács

(57) ABSTRACT

An implement that substantially reduces the likelihood of material being blown out from the underside thereof is provided. To decrease this likelihood, the implement is constructed with a lip that extends outwardly from the front edge of its center chamber. Further provided is an adjustable extension to the lip which may be made part of the implement at the option of the operator. In providing an implement with both the lip and its extension, an operator is permitted to insure against the possibility of vegetation and debris leaving the underside of the deck at the front of the center chamber. Consequently, the overall appearance of one's grounds may be greatly enhanced.

1 Claim, 5 Drawing Sheets

CUTTING IMPLEMENT HAVING ANTI-BLOWOUT LIP AND EXTENSION

FIELD OF THE INVENTION

This invention relates to cutting implements having multiple cutting chambers, and more specifically, to structure for reducing the amount of dried vegetation and other material from being thrown out the front of the implement beneath the front wall thereof.

BACKGROUND OF THE INVENTION

Multiple blade cutting implements frequently consist of three separate chambers or adjoining enclosures which contain a respective cutting blade therein. As each of the blades rotates within its chamber to cut vegetation beneath it, an air flow is created with respect to the direction in which the vegetation moves after it is cut and until it is discharged from the implement. Typically in the case of three chamber decks having, respectively, a left, center and right hand chamber, this flow moves from the left chamber towards the right chamber and thereafter exits through a discharge opening in the implement.

It has been noticed that upon movement of the above flow from the left to center chambers, a sizeable amount of vegetation that is cut is blown out in front of the center chamber. As used therein, "blown out" refers to the condition where cut material is propelled out of the cutting chambers below the edges thereof and thus the front wall of the implement. This condition occurs as a result of the throwing action of the center blade as it contacts vegetation moving from the left chamber and attempts to convey this vegetation through the center chamber and remainder of the implement. Further, the condition is most noticeable when the vegetation that is being cut is dry and, consequently, lighter than it might otherwise be thereby permitting it to be more easily dispersed within the implement.

To help retain material that is cut or disturbed by their blades, cutting implements or decks of the type described above are typically constructed with skirts or walls which extend downwardly from their top surfaces. When constructed, however, these skirts are often manufactured to be higher at the fronts of the decks than they are at the rear portions thereof. As a result, the cutting plane of the blade carried within a particular chamber falls slightly below the lowest portion of the front of a particular deck, thereby leaving an open gap. With this type of construction, a number of concerns have arisen.

Among these concerns are the appearance of the lawn or grass after it has been cut by an implement having the above construction. With skirts having this type of design, vegetation and other debris that is cut and/or caught up in the discharge stream often tends to escape the deck below its front edge. This escape of material commonly has occurred at the middle and right front portion(s) of the center chamber. Consequently, an unkept appearance of one's grounds results, thereby requiring an operator to spend additional time and effort in maintaining their appearance.

Further, past designs which have sought to address the above difficulty of dry and other material being thrown from the underside of the deck have sought to address the above concerns by providing a horizontal or vertical baffle which extends across the front edge of the deck in the area of the center chamber. This first baffle has been constructed to be even with and extend horizontally inwardly from the deck's front edge. In providing this form or type of solution, the attempt to close the above mentioned gap has not been successful since the baffle has not extended below the cutting plane of the blade. Thus, material such as vegetation and other debris has still escaped through the described gap.

Still further, a vertical baffle has also been used as stated above. This baffle has extended downwardly from the front of the deck and, like the horizontal baffle above, has decreased the cutting performance of the implement on which it is used. This decrease in performance results from an increased amount of structure at the deck's front edge which knocks down the grass and other vegetation in its path. Since the baffle is vertical and serves as a downward continuation of the deck's edge across the front of the center chamber, vegetation of the type mentioned is bent over for a longer period of time than it would otherwise be if some other device or shielding mechanism were used. As a consequence of being taken out of its upright stance for the period of time that it is in contact with the baffle, it has been observed that the vegetation does not have enough time to be lifted or raised by the cutting blade(s). Accordingly, cutting of the vegetation cannot occur as it should because the grass is still bent over when the time arrives for the cutting edge of the blade to slice a particular piece of grass or other type of vegetation.

Thus, there exists a need for a device that forms a part of the deck so as to enable vegetation and other debris that is contacted by the blade(s) thereof from escaping from the underside of the deck and, especially, from the center chamber thereof.

SUMMARY OF THE INVENTION

Accordingly, there is provided a device that forms part of the deck and acts as a shield or guard to assist in retaining vegetation and other debris that is cut and/or disturbed by the deck's blade(s) from leaving its respective cutting chambers. Further, the implement is provided with an adjustable extension to the previous device so as to further insure that an operator is permitted to maintain the overall appearance of the grounds. These capabilities are provided without reducing the maximum level of cutting performance that is obtainable from the deck.

Specifically, the first of the two above devices is provided in the form of a lip that is made integral with, or as one-piece of, the front edge of the deck. The lip is extended vertically downwardly to the level of the cutting plane of, particularly, the center blade. Moreover, it is constructed to sit off to the left of the midpoint of the center blade. It is in this area that the streams of cut material from the two adjacent blades converge. Positioning the lip in this manner substantially decreases the likelihood that vegetation which has been cut and debris that has been disturbed will escape from the center chamber, and thus the, deck itself.

To further insure against the ability of the center blade to project items beyond the structure of the center and at least one other adjoining chamber, the second device is provided as an adjustable extension to the lip. This extension may be made part of the implement when its operator finds a desire or need for its use insofar as the escape of materials from the area in which the left and center chambers border each other is noticed.

Accordingly, there is provided an implement which substantially reduces the likelihood of vegetation and other debris escaping therefrom and, particularly, from the center chamber thereof. In reducing that likelihood, the implement helps to insure the overall appearance of one's grounds.

DESCRIPTION OF THE PREFERRED EMBODIMENT

Figure 1:
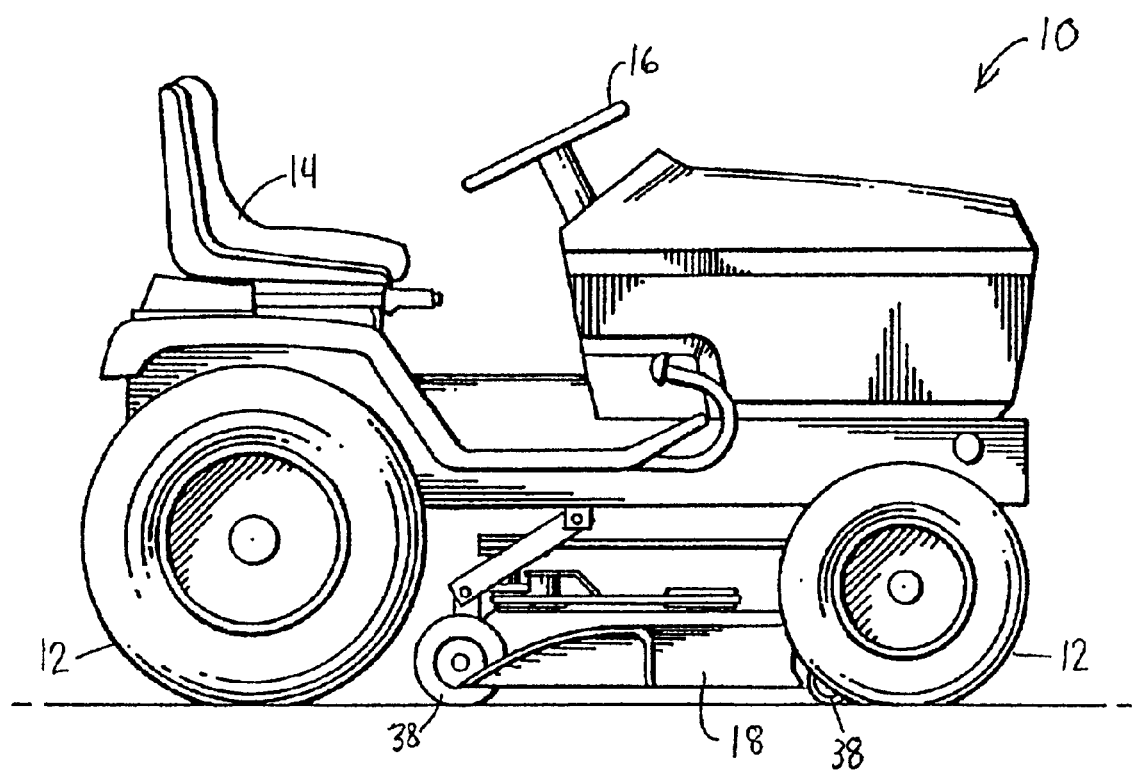
FIG. 1 is a side view of a lawn and garden tractor having an implement in the form of a cutting deck mounted at its mid-portion.

Looking to FIG. 1, there is provided a lawn and garden tractor 10 supported upon a plurality of ground engaging wheels 12, a seat 14 and a steering wheel 16 located in front thereof. Further included as part of the tractor is a multi-chamber cutting implement or deck 18 mounted to the middle thereof.

Figure 2:
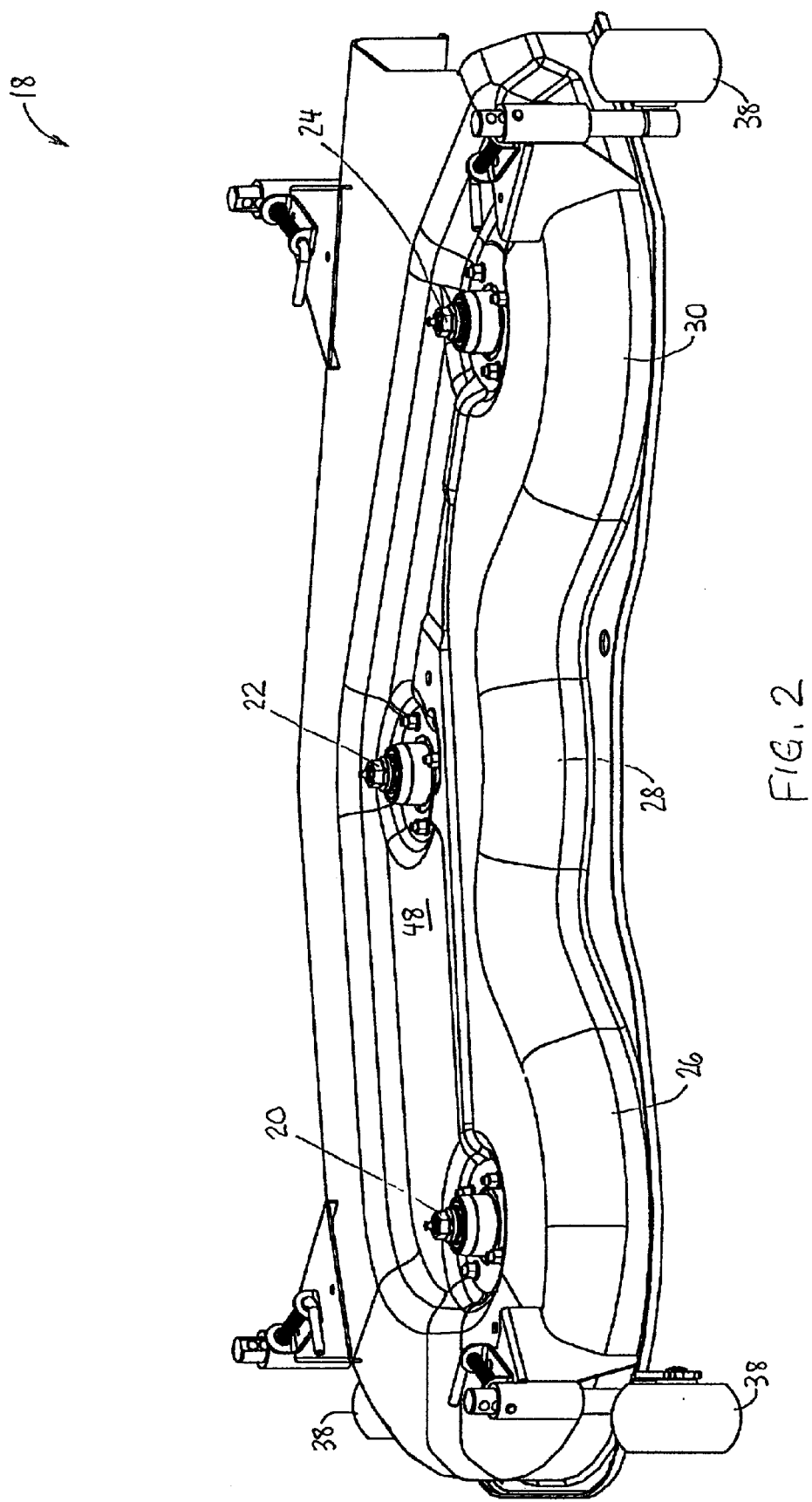
FIG. 2 is a rear perspective view of the deck shown in FIG. 1.
Figure 4:
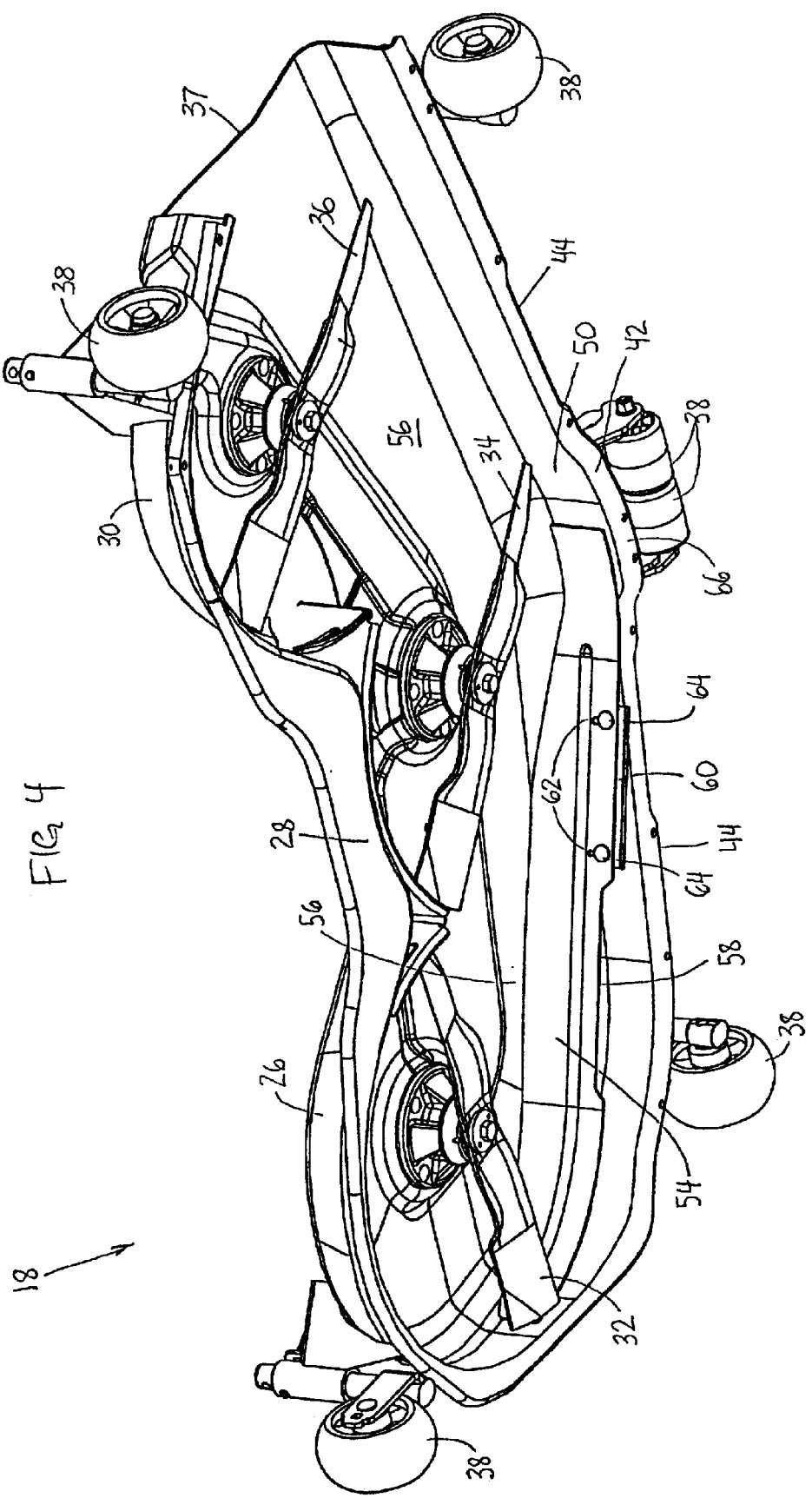
FIG. 4 is a rear view of the deck illustrating its underside including the lip, a baffle forming an extension thereof and the relationship of both relative to the cutting planes of the blades enclosed by the deck.

FIG. 2 more closely illustrates the cutting deck 18 that is shown attached to the tractor 10 of FIG. 1. The deck 18 includes three cutting spindles 20, 22 and 24 that are mounted with three cutting chambers 26, 28 and 30, respectively oriented from left to right, which each house or enclose a blade 32, 34 or 36 respectively therein, as shown in FIGS. 2 and 4. Adjacent right chamber 36 is a discharge opening 37 through which vegetation is thrown or expelled after it is cut. Attached to the front and each of the four corner areas of the deck are anti-scalp wheels 38 used to carry the deck 18 over unexpected changes in elevation in the ground that is traveled by the tractor 10.

Figure 3:
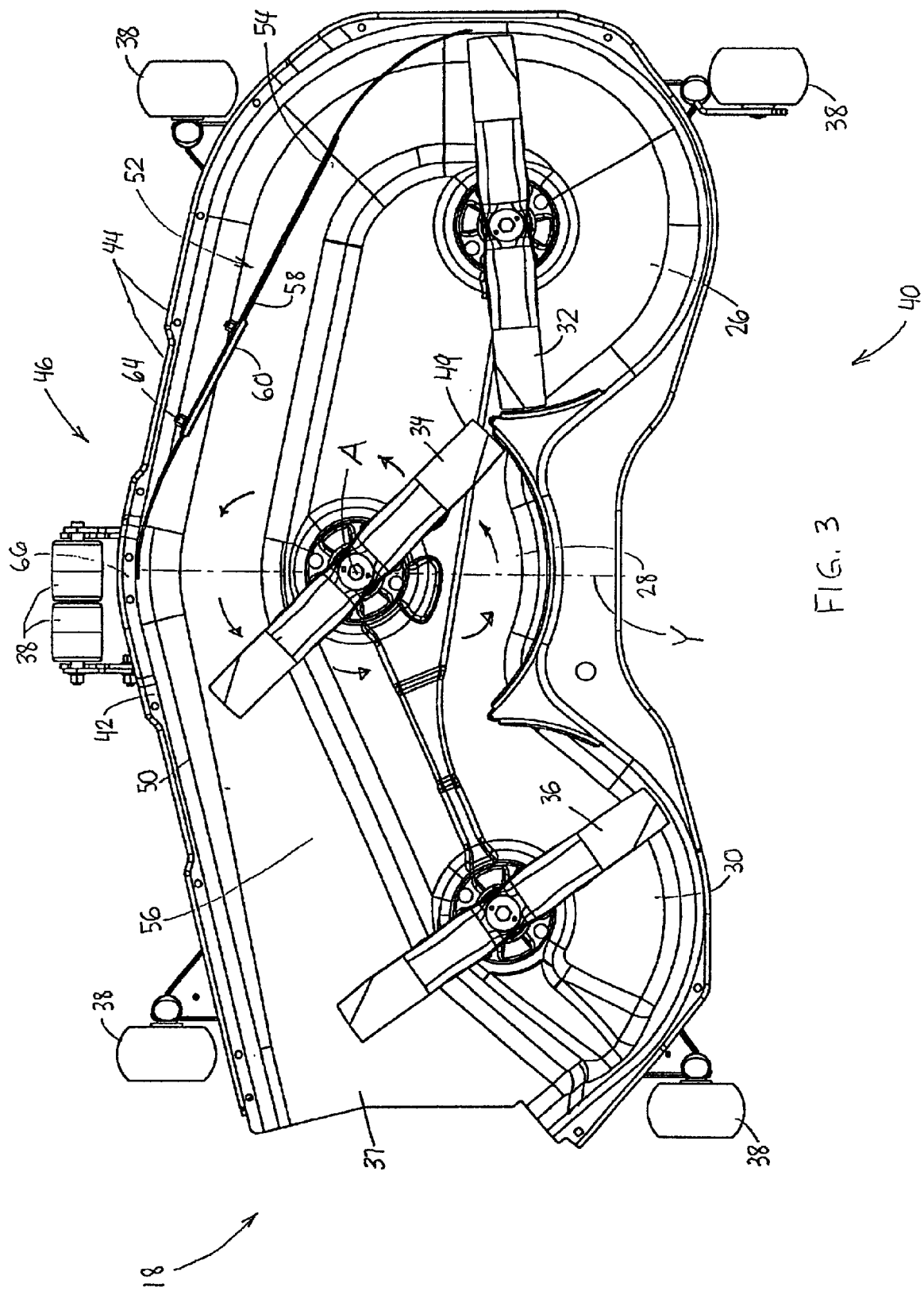
FIG. 3 is a bottom view of the underside of the deck and is shown to include the lip of the present invention.

Referring now to FIGS. 3 and 4, it can be seen that the underside 40 of the deck includes a lip 42 at the front edge 44 thereof and, particularly, at the front edge 46 of the center chamber 28. As can be understood from the figures, the lip 42 is provided as part of the construction of the deck 18 and does not bow laterally outwardly any more than any other part of the deck's edge 44 except to the extent that the curvature along a specific length of the front edge 46 of the center chamber 28 may require. Construction of the lip 42 in this manner permits decreased contact with vegetation in the implement's travel path so as to permit the center blade 34 to be as effective as possible in being able to adequately lift and cut that vegetation.

Figure 5:
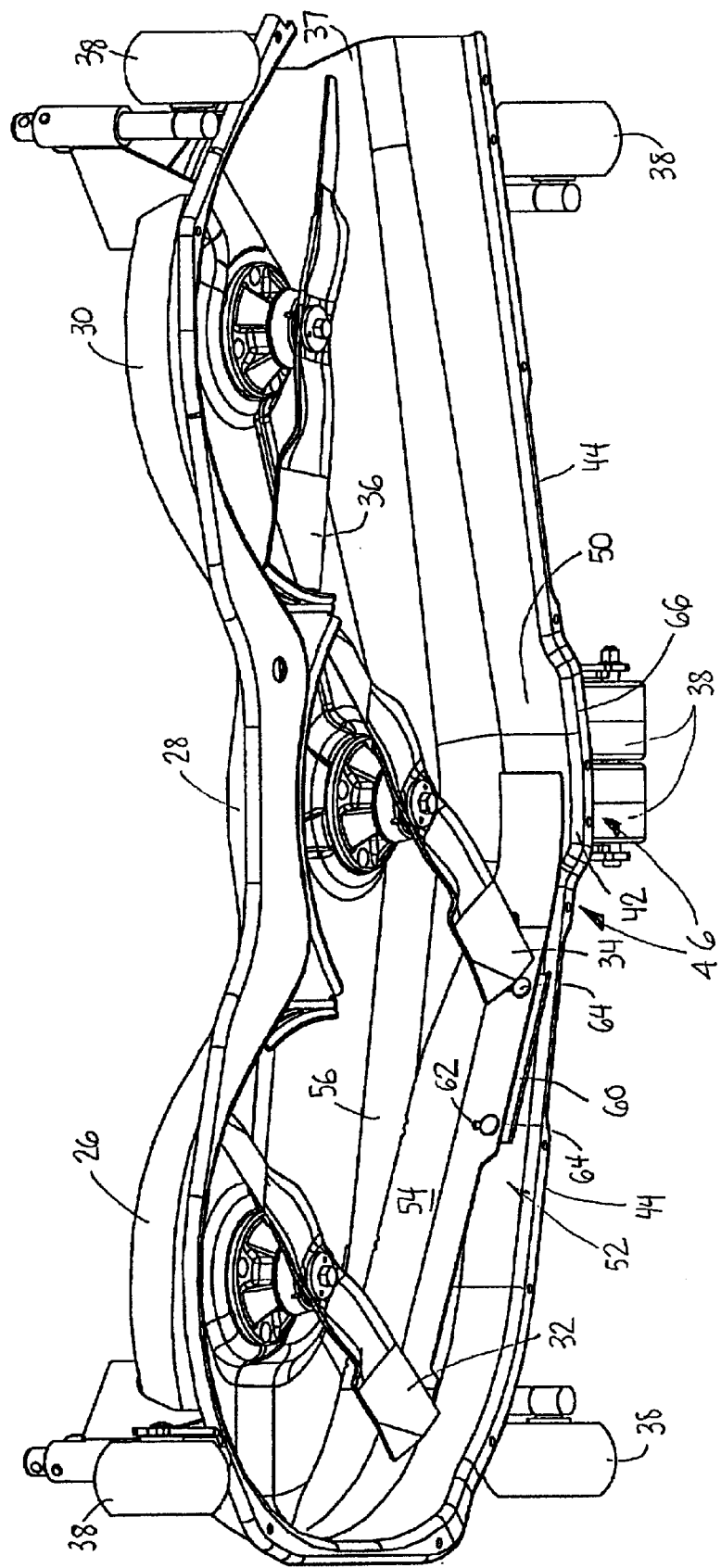
FIG. 5 is a rear elevated view of the deck according to FIG. 4 and is provided to illustrate the placement of the lip relative to the center line of the center blade.

Looking now to FIG. 5, it can further be seen that the lip 42 extends vertically downward from the top surface 48 of the deck 18 and into the cutting plane of the center blade 34. The lip 42 is positioned to be off-center, or to the right, of the midpoint A of the center blade 34. Referring to FIG. 3, as the blade 34 rotates, it passes through an axis Y, shown therein, that extends through the midpoint A and which is perpendicular to the longitudinal axis of the deck 18. On a right hand side of the deck 18 at midpoint A (the left hand side of the axis Y as shown in FIG. 3), the blade conducts a forward sweep of the grass as indicated by the arrows. Grass on this side is adequately cut since the lip 42 is shortened, as shown in FIG. 5, so as not to extend across the path of the cutting edge of the blade 34 and because the cutting plane of the blade is slightly lower than the front edge of the deck. On a left hand side of the deck 18 at midpoint A (the right hand side of the axis Y as shown in FIG. 3), the blade 34 enters into a rearward sweep as shown by the arrows. In this rearward sweep, grass contacted by the lip 42 is bent forwardly. When in this stance, the grass is bent towards or into the cutting path or plane of the blade 34 and therefore adequately lifted and cut by the blade even though it has contacted the lip 42. With this positioning and in view of the clockwise (counterclockwise when viewed from the underside of the deck as in FIG. 3) rotation of the blades 32, 34 and 36, vegetation and other debris that is thrown by the center blade 34 towards the front inside wall 50 of the chamber 28 is shielded by the lip 42 at the point where the streams of air and cut material from the left and center chambers 26, 28 merge. Upon being shielded, that vegetation or debris is substantially prevented from leaving the deck 18, thereby reducing the effects of materials being dispersed from the underside 40 thereof.

Additionally, the deck 18 includes a second debris shielding arrangement 52. As seen in FIGS. 4 and 5, the arrangement includes a first baffle 54 for also shielding debris and directing the flow of vegetation that is cut, primarily, by the left blade 32 and, to a lesser extent, the center blade 34 as well. The baffle 54 is, preferably, made of steel or a similar metal, and is mounted to the top surface 56 of the underside 40 of the deck 18 by welding. As can further be seen, the baffle 54 includes a notch 58 that is of a size and width to permit vegetation that has been bent over by the tractor's left front tire to be able to stand back up prior to meeting the left blade 32. With this notch 58, vegetation traveled by the deck 18 can be adequately and properly cut as the tractor 10 passes.

Still referring to FIGS. 4 and 5, the baffle 54 is constructed to carry a second baffle or plate 60 thereon, the positioning of which is to the left of the lip 42 and center line of the center blade 34. This second baffle 60 is provided to be adjustable within and is securable to the first baffle 54 at its mounting slots 62 with bolts 64. Adjustably securing the baffle 60 in this manner and location allows it to be extended to the level of the cutting planes of both the left and center blades 32 and 34 such that it is even with the bottom edge 66 of the lip 42. With such an extension capability, the baffle 54 is effectively a continuation of the lip 42 in an area in which blowout of drier vegetation and other debris is likely and has been most frequently noticed. Additionally, the center blade 34 and left blade 32 will conduct the same forward and rearward sweeps mentioned in relation to the lip 42.

Thus, there is provided an implement that reduces the likelihood that dried vegetation and other debris will escape the implement when they are impacted and then be thrown from the blades thereof.

Having described the preferred embodiment, it will become apparent that various modifications can be made without departing from the scope of the invention as defined in the accompanying claims.

We claim:

1. A cutting implement usable with a vehicle having front and rear wheels, the implement comprising:

a) first and second cutting chambers positioned near one another, each of the chambers having a laterally extending front edge on an exterior thereof;

b) first and second cutting blades centered within each of the first and second chambers and rotatable therein to define a cutting plane along which vegetation may be cut;

c) a generally vertically extending lip formed as a portion of the front edge of one of the chambers and depending therefrom such that it extends both to a point that 15 lower than a second portion of the front edge and to the level of the cuffing plane of the at least one of the blades, the lip being off center from the midpoint of the at least one of the blades so as to substantially shield the vegetation and other debris from exiting the implement after being contacted by at least one of the blades therein; and d) an arcuately shaped first baffle carried within the chamber of the other blade and spanning portions of both the first and second chambers for shielding material projected by the other blade, the first baffle including a notched section thereon that is alignable with one of the front wheels of the vehicle with which the implement may be used, the first baffle carrying a second baffle thereon for shielding material projected by the at least one of the blades from exiting the implement upon being contacted thereby, the second baffle being adjustable so as to align with a bottom portion of the generally vertically extending lip so as to also extend into the cutting planes of both the first and second blades.

* * * * *